(12) United States Patent
Schlemmer-Kelling

(10) Patent No.: US 8,978,359 B2
(45) Date of Patent: Mar. 17, 2015

(54) TWO-STAGE TURBOCHARGED ENGINE

(75) Inventor: Udo Schlemmer-Kelling, Molfsee (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 118 days.

(21) Appl. No.: 13/814,340

(22) PCT Filed: Aug. 5, 2011

(86) PCT No.: PCT/EP2011/003944
§ 371 (c)(1),
(2), (4) Date: Feb. 27, 2013

(87) PCT Pub. No.: WO2012/016712
PCT Pub. Date: Feb. 9, 2012

(65) Prior Publication Data
US 2013/0199162 A1  Aug. 8, 2013

(30) Foreign Application Priority Data

Aug. 6, 2010  (EP) .................................. 10172133
Oct. 8, 2010  (EP) .................................. 10186972

(51) Int. Cl.
*F01N 5/04*  (2006.01)
*F02B 37/00*  (2006.01)
(Continued)

(52) U.S. Cl.
CPC .............. *F02B 37/00* (2013.01); *F01N 3/106* (2013.01); *F01N 3/208* (2013.01); *F02B 37/013* (2013.01); *F02B 37/02* (2013.01); *F02B 37/18* (2013.01);
(Continued)

(58) Field of Classification Search
USPC ........... 60/278, 280, 286, 295, 299, 301, 320, 60/324, 612; 123/562
See application file for complete search history.

(56) References Cited

U.S. PATENT DOCUMENTS 5,564,275 A  10/1996  Codan et al.
5,924,280 A  7/1999  Tarabulski
(Continued)

FOREIGN PATENT DOCUMENTS

DE  4312462 A1  10/1994
DE  102004002325 B3  6/2005
(Continued)

OTHER PUBLICATIONS

MAN Diesel & Turbo, MAN 12V48/60 Engine Features SCR System; Commissioned MAN 12V48/60 Engine Features SCR System in Endesa Diesel Power Plant in Ceauta; pp. 1-2; Copenhagen.

*Primary Examiner* — Thomas Denion
*Assistant Examiner* — Jorge Leon, Jr.
(74) *Attorney, Agent, or Firm* — BakerHostetler

(57) ABSTRACT

A turbocharged internal combustion engine disclosed that may comprise an engine block with a first end side opposing a second end side and a two-stage turbocharged system. The two-stage turbocharged system may comprise a low-pressure turbocharger with a first turbine and a first compressor and a high-pressure turbocharger with a second turbine and a second compressor. A turbine connection may fluidly connect the first turbine and the second turbine and a compressor connection fluidly connects the first compressor and the second compressor. The low-pressure turbocharger is mounted at the first end side of the engine block and the high-pressure turbocharger is mounted at a second end side of the engine block.

30 Claims, 9 Drawing Sheets

(51) Int. Cl.
  *F01N 3/10* (2006.01)
  *F01N 3/20* (2006.01)
  *F02B 37/013* (2006.01)
  *F02B 37/02* (2006.01)
  *F02B 37/18* (2006.01)
  *F01N 13/18* (2010.01)
  *F02B 67/10* (2006.01)

(52) U.S. Cl.
  CPC .......... *F02B 37/004* (2013.01); *F01N 13/1805* (2013.01); *F02B 67/10* (2013.01); *F01N 2340/04* (2013.01); *F01N 2610/02* (2013.01); *Y02T 10/144* (2013.01); *Y02T 10/24* (2013.01)
  USPC .................. 60/280; 60/278; 60/286; 60/295; 60/301; 60/320; 60/324; 60/612; 123/562

(56) References Cited

U.S. PATENT DOCUMENTS

| | | | |
|---|---|---|---|
| 7,426,825 B2 | 9/2008 | Viola et al. | |
| 8,371,108 B2 * | 2/2013 | Chyo | 60/286 |
| 8,561,404 B2 * | 10/2013 | Melchior | 60/612 |
| 2006/0059910 A1 * | 3/2006 | Spaeder et al. | 60/612 |
| 2006/0123788 A1 * | 6/2006 | Gobert et al. | 60/612 |
| 2009/0193794 A1 | 8/2009 | Robel et al. | |
| 2010/0050597 A1 | 3/2010 | Crehan | |
| 2010/0071365 A1 * | 3/2010 | Laermann et al. | 60/605.2 |
| 2010/0146965 A1 * | 6/2010 | Easley et al. | 60/602 |
| 2010/0319342 A1 * | 12/2010 | Brown et al. | 60/598 |
| 2010/0326059 A1 * | 12/2010 | Mital et al. | 60/297 |
| 2011/0020108 A1 * | 1/2011 | Axelsson et al. | 415/66 |
| 2011/0030349 A1 * | 2/2011 | Makartchouk et al. | 60/286 |
| 2011/0146269 A1 * | 6/2011 | Hepburn et al. | 60/602 |

FOREIGN PATENT DOCUMENTS

| | | |
|---|---|---|
| DE | 102004027593 | 12/2005 |
| DE | 10218723 B4 | 2/2006 |
| DE | 10330352 B4 | 3/2008 |
| DE | 102008017280 | 11/2009 |
| DE | 102008061222 | 6/2010 |
| DE | 102009005285 | 7/2010 |
| EP | 0707142 B1 | 1/1999 |
| EP | 1691046 | 8/2006 |
| EP | 1496243 B1 | 6/2007 |
| EP | 2218896 | 8/2010 |
| EP | 2330287 | 6/2011 |
| FR | 2914010 A1 | 9/2009 |
| JP | 7-34882 A | 2/1995 |
| WO | WO 2007115659 A2 * | 10/2007 |
| WO | 2008054631 | 5/2008 |
| WO | 2009017598 | 2/2009 |
| WO | 2009025775 | 2/2009 |
| WO | 2009111223 | 9/2009 |

* cited by examiner

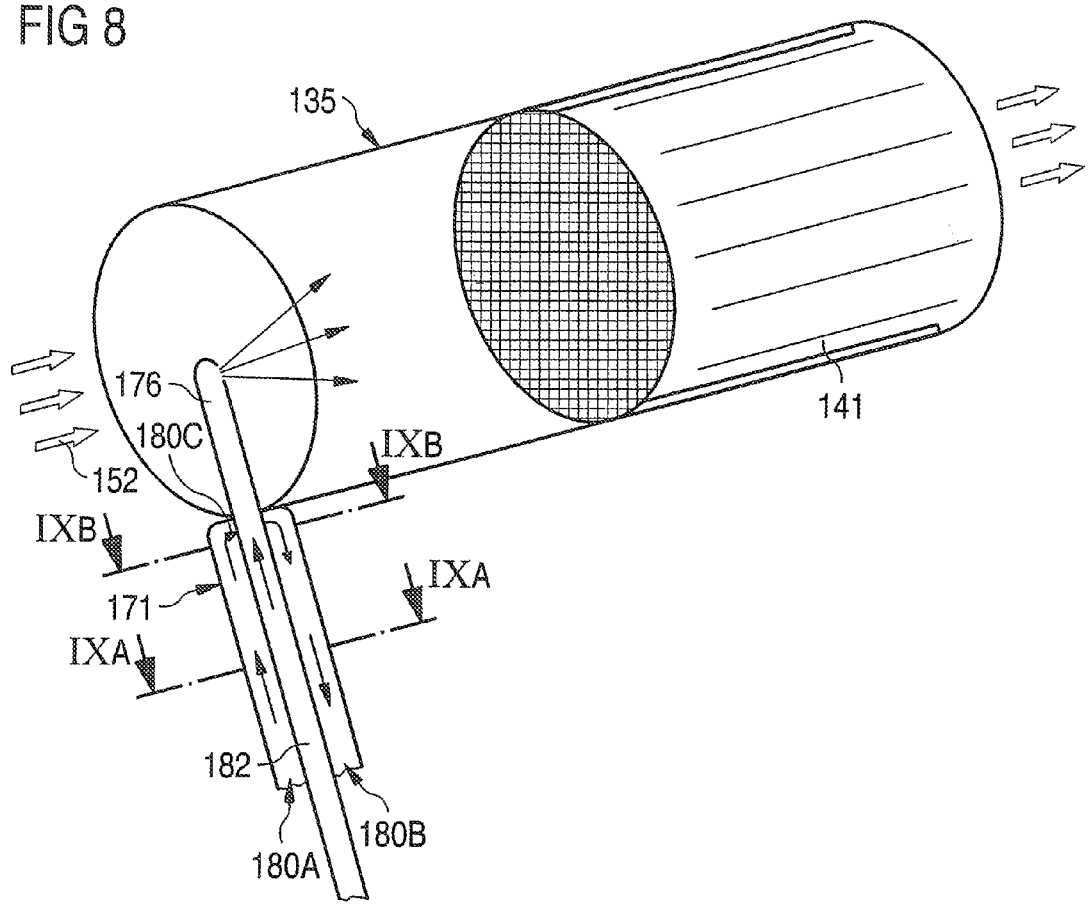

TWO-STAGE TURBOCHARGED ENGINE

TECHNICAL FIELD

The present disclosure generally refers to a turbocharged engine system and more particularly to a configuration of a two-stage turbocharged system with a catalyst system.

BACKGROUND

Internal combustion engines exhaust a complex mixture of air pollutants. These air pollutants are composed of gaseous compounds such as nitrogen oxides ($NO_X$), and solid particulate matter also known as soot. Due to increased environmental awareness, exhaust emission standards have become more stringent, and the amount of $NO_X$ and soot emitted to the atmosphere by an engine may be regulated depending on the type of engine, size of engine, and/or class of engine.

In order to ensure compliance with the regulation of $NO_X$, a strategy called selective catalytic reduction (SCR) for treating the exhaust gas can be implemented. SCR is a process where a gaseous or liquid reductant, e.g. ammonia, urea or a urea solution, is injected into the exhaust gas stream of an engine. The reductant reacts with nitrogen oxides in the exhaust gas to form water and nitrogen. Usually, urea is introduced into the exhaust gas in an amount sufficient to provide the degree of $NO_X$-reduction desired. The desired amount of the reductant can be controlled by, e.g., a urea injection system.

Generally, SCR can be effective, e.g., within a temperature range from about 200° C. to about 500° C. Through providing a catalytic surface in the form of the SCR catalyst, the SCR process can be promoted and more efficiently performed, in particular, at lower temperatures. Thus, it is important to provide a suitable temperature and a suitable catalytic material with a sufficiently large surface for the SCR reaction.

SCR as used herein generally includes those processes that utilize ammonia or any $NO_X$-reducing reagent capable of generating ammonia gas upon heating. The term "urea" as used herein is further meant to comprise all those reductants that are commercially available for performing SCR.

An SCR emission control system is disclosed, for example, in WO 2009/017598 A1 and a temperature-adjusted SCR system is disclosed, for example, in WO 2008/054631 A1. Moreover, DE 10 2008 017 280 A1 discloses an arrangement of at least one catalyst and/or particulate filter within a two-stage turbocharged system. Moreover, DE 10 2008 061 222 A1 discloses a multi-stage charged combustion engine having an SCR catalyst arranged between a high-pressure turbine and a low-pressure turbine, wherein the housing of the low-pressure turbine and the housing of the catalyst are mounted to the engine.

EP 1 691 046 A1 discloses a temperature maintenance device for maintaining the temperature of a reducing agent in an exhaust gas clarification apparatus for an engine.

As an alternative for SCR, exhaust gas recycling (EGR) is used to reduce $NO_X$ emission. The not yet published EP application 09002111 (filed by Caterpillar Motoren GmbH & Co. KG on 16 Feb. 2009) discloses a turbocharged engine with exhaust gas recycling. In particular, the EP application discloses an engine having end sides being opposite in a lengthwise direction of a crankshaft. On each side, a single-stage turbocharger system, i.e. an exhaust turbocharger with a turbine and a compressor, is arranged. The turbines are fluidly connected to a common exhaust manifold of the engine, while the compressors are fluidly connected to a common intake manifold of the engine.

For medium speed internal combustion engines, two-stage turbocharged systems having a low-pressure stage turbocharger and high-pressure stage turbocharger can be used to pre-compress the charge air being provided to the combustion chambers. The turbocharged systems can be mounted to one side of an engine block and, accordingly, can be exposed to vibrations caused by the operating engine. Usually, the low-pressure stage turbocharger of a two-stage turbocharged system may be exposed to an increased oscillation amplitude if it is mounted at a relatively large distance via the high-pressure stage turbocharger to the engine.

Furthermore, oxidation catalysts are known for exhaust gas treatment, e.g., of diesel and natural gas engines.

In addition, in order to provide a sufficiently large surface for the catalytic reaction, the size of the, e.g., SCR catalyst can increase with the amount of exhaust gas generated, e.g., for medium speed internal combustion engines.

The present disclosure is directed, at least in part, to improving or overcoming one or more aspects of prior systems.

SUMMARY OF THE DISCLOSURE

According to an aspect of the present disclosure, a turbocharged internal combustion engine may comprise an engine block with a first end side opposing a second end side having a plurality of cylinders and a two-stage turbocharged system that comprises a low-pressure stage turbocharger mounted at the first end side of the engine block and comprising a first turbine and a first compressor configured for pre-compressing charge air during operation of the turbocharged internal combustion engine, a high-pressure stage turbocharger mounted at the second end side of the engine block and comprising a second turbine and a second compressor configured for compressing the pre-compressed charge air during operation of the turbocharged internal combustion engine, a compressor connection fluidly connecting the first compressor and the second compressor; and a turbine connection fluidly connecting the first turbine and the second turbine. The engine may further comprise a selective catalytic reduction catalyst positioned within a catalyst section of the turbine connection; an exhaust manifold fluidly connecting exhaust outlets of the plurality of cylinders with an inlet of the second turbine; and an injection system with an injection inlet configured for injecting a chemical substance for the SCR through the injection inlet into the exhaust manifold and/or the second turbine.

According to another aspect of the present disclosure, a turbocharged internal combustion engine may comprise an engine block with a first end side opposing a second end side and a two-stage turbocharged system. The two-stage turbocharged system may comprise a low-pressure stage turbocharger with a first turbine and a first compressor configured for pre-compressing charge air during operation of the turbocharged internal combustion engine. The low-pressure turbocharger may be mounted at the first end side of the engine block. The two-stage turbocharged system may further comprise a high-pressure stage turbocharger with a second turbine and a second compressor configured for compressing the pre-compressed charge air during operation of the turbocharged internal combustion engine. The high-pressure turbocharger may be mounted at the second end side of the engine block. A turbine connection may fluidly connect the first turbine and the second turbine and a compressor connection may fluidly connect the first compressor and the second compressor.

According to another aspect of the present disclosure, a turbocharged internal combustion engine may comprise an engine block with a first end side opposing a second end side and a two-stage turbocharged system. The two-stage turbocharged system may comprise a low-pressure stage turbocharger with a first turbine and a first compressor and a high-pressure stage turbocharger with a second turbine and a second compressor. A turbine connection may fluidly connect the first turbine and the second turbine and a compressor connection may fluidly connect the first compressor and the second compressor. The low-pressure turbocharger may be mounted at the first end side of the engine block and the high-pressure turbocharger may be mounted at the second end side of the engine block. The turbine connection may extend along a long side of the engine block. The engine may further comprise a reagent (e.g. urea) injection system configured to inject a reagent (e.g. urea) through an injection inlet within the turbine connection into exhaust gas from the internal combustion engine and to perform a catalytic reaction (e.g. a selective catalytic reduction) on a catalyst positioned within a catalyst section of the turbine connection, the catalyst section being arranged downstream of the injection inlet.

According to another aspect of the present disclosure, a turbocharged internal combustion engine may comprise an engine block with a first end side opposing a second end side and a two-stage turbocharged system. The two-stage turbocharged system may comprise a low-pressure stage turbocharger being mounted at the first end side of the engine block and comprising a first turbine and a first compressor, a high-pressure stage turbocharger being mounted at the second end side of the engine block and comprising a second turbine and a second compressor, a compressor connection fluidly connecting the first compressor and the second compressor, a turbine connection fluidly connecting the first turbine and the second turbine, and a catalytic system positioned at least partly within a catalyst section of the turbine connection.

According to another aspect of the present disclosure, an internal combustion engine may comprise an engine block and an exhaust gas system. The exhaust gas system may comprise connection tubes fluidly connecting elements of the exhaust gas system, e.g. stages of a turbocharged system of the internal combustion engine such as first turbine and a second turbine, and elements of a catalytic system, e.g. an SCR catalyst system. The exhaust gas system may further comprise an injection system for injecting one or more exhaust gas treatment substances into the exhaust gas system. For example, a urea injection system of an SCR catalyst system may be provided for injecting urea in a connection tube of the exhaust gas system. Alternatively or additionally, further exhaust gas treatment substances can be injected with a separate or the same injection system. For example, ferrocene can be injected, e.g. to reduce soot formation. The injection system may comprise a cooling system to cool the one or more exhaust gas treatment substances before injection. Additionally or alternatively to injecting substances into the exhaust gas, substances can also be injected into gases supplied to the combustion process within the cylinders. Examples include air and exhaust gas, the latter being mixed, for example, into the air. The cooling system can ensure that the substances are injected in the appropriate physical state (e.g. liquid) despite being subjected to the increased temperatures close to the engine.

Other features and aspects of this disclosure will be apparent from the following description and the accompanying drawings.

BRIEF DESCRIPTION OF THE DRAWINGS

FIG. 8 is a schematic of a turbine connection with a cooled urea injection system.

DETAILED DESCRIPTION

Figure 1:
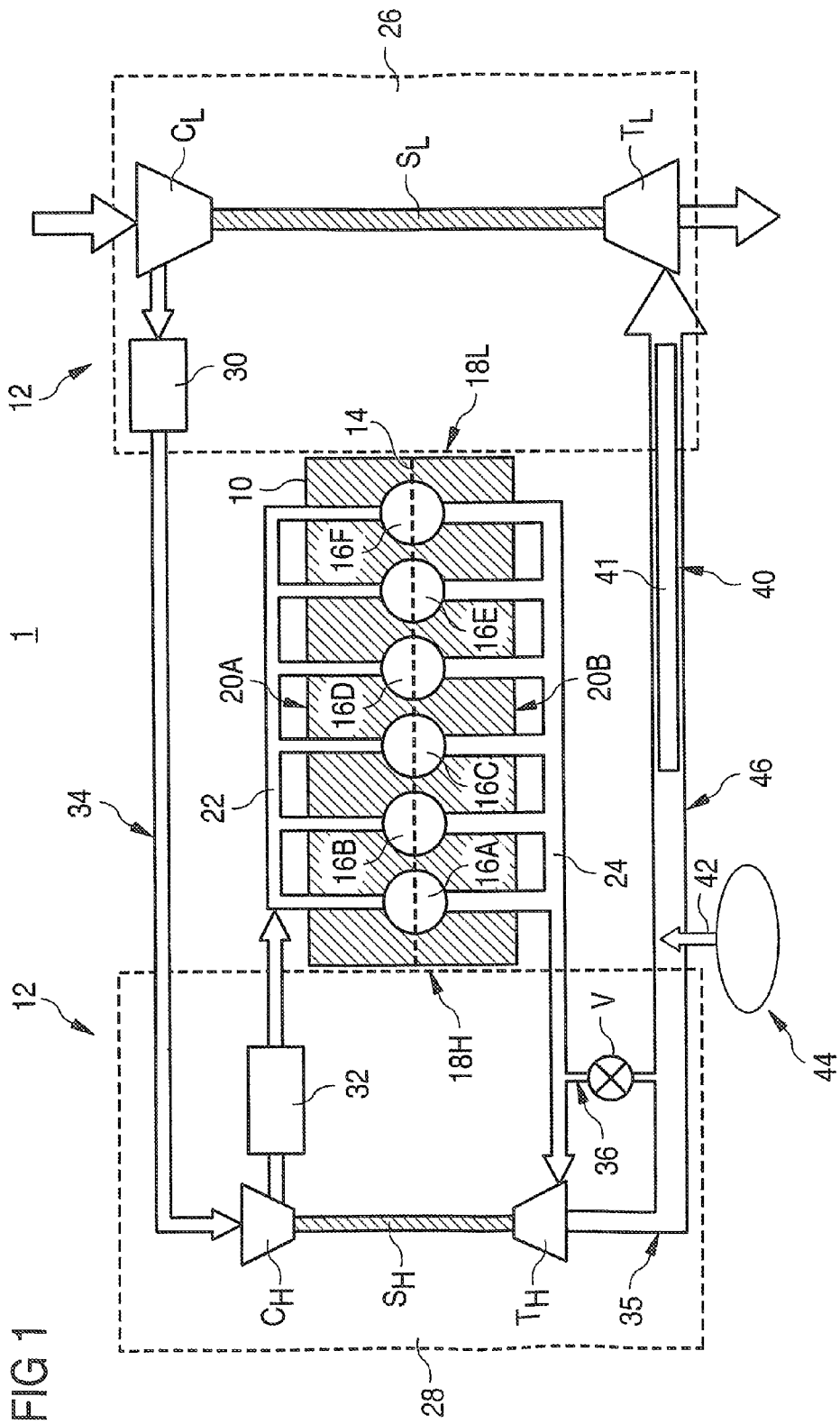
FIG. 1 is a schematic top view of an internal combustion engine with a two-stage turbocharged system with a first catalyst configuration.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure may be based in part on the discovery that mounting each of the turbocharger stages of a two-stage turbocharged system close to the vibration source may reduce the amplitude of the vibration and, thereby, may reduce the mechanical stress onto the turbocharged stages usually caused by the vibrations of the engine during operation.

In addition, the disclosure may be based in part on the discovery that, when mounting the stages of a two-stage turbocharged system on opposing end sides of an engine, the connections between the compressors and the turbines of the two-stage turbocharged system extend along essentially the complete length side of the engine and, thus, provide therein additional space for implementing an SCR system.

In addition, the disclosure may be based in part on the discovery that, when implementing SCR, an injection system with an injection inlet configured for injecting a chemical substance for the SCR may be injected upstream of the high-pressure turbine thereby causing a well defined mixture of the agent within the exhaust and allowing mounting the SCR catalyst close to the high-pressure turbine. For example, the injection inlet may be positioned for injection into the exhaust manifold and/or the high-pressure turbine.

Exemplary embodiments of a two-stage turbocharged internal combustion engine with an exhaust SCR system are described in the following with reference to FIGS. 1 to 9.

Figure 2:
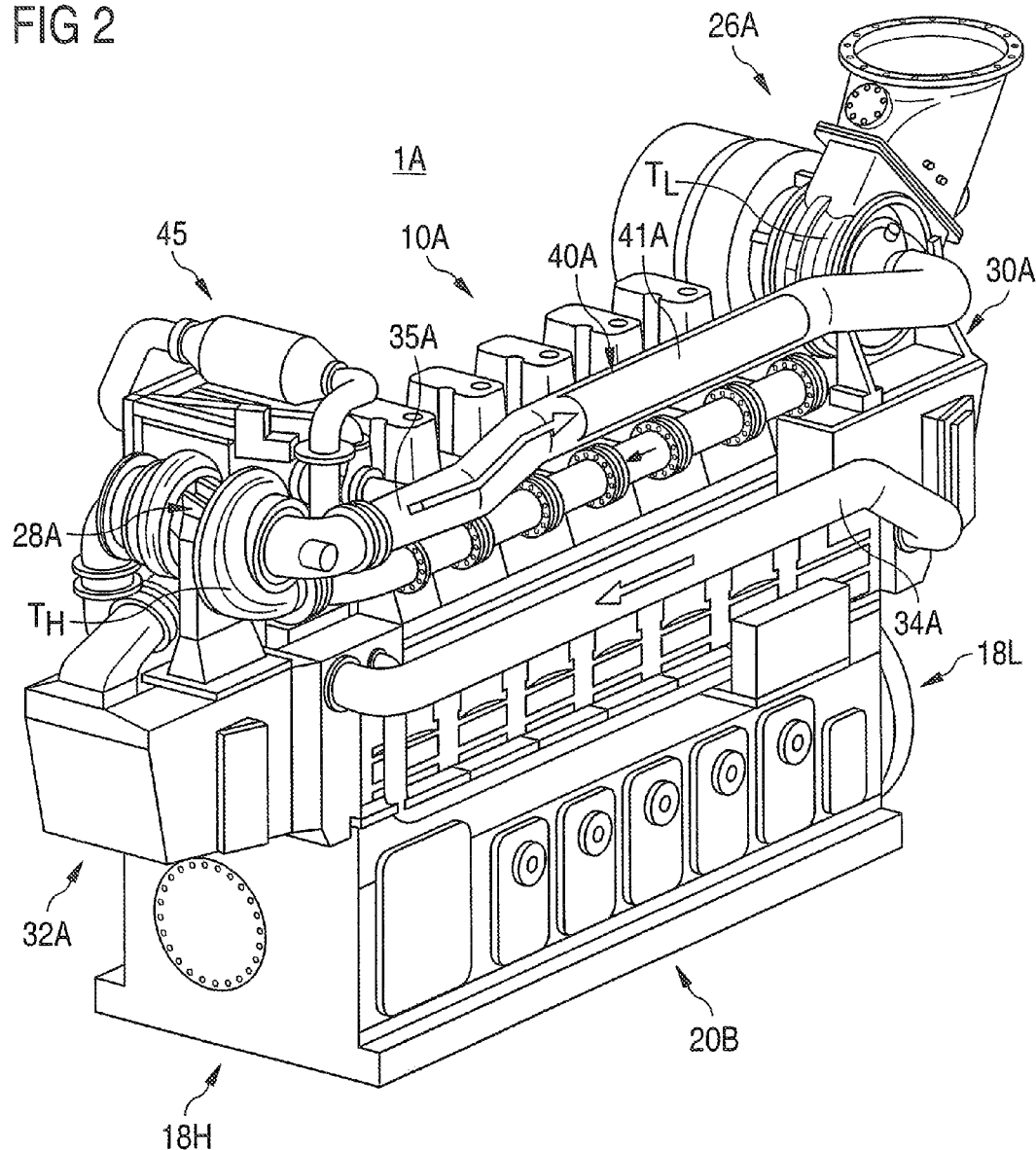
FIG. 2 is a schematic perspective view of an internal combustion engine with a two-stage turbocharged system.
Figure 3:
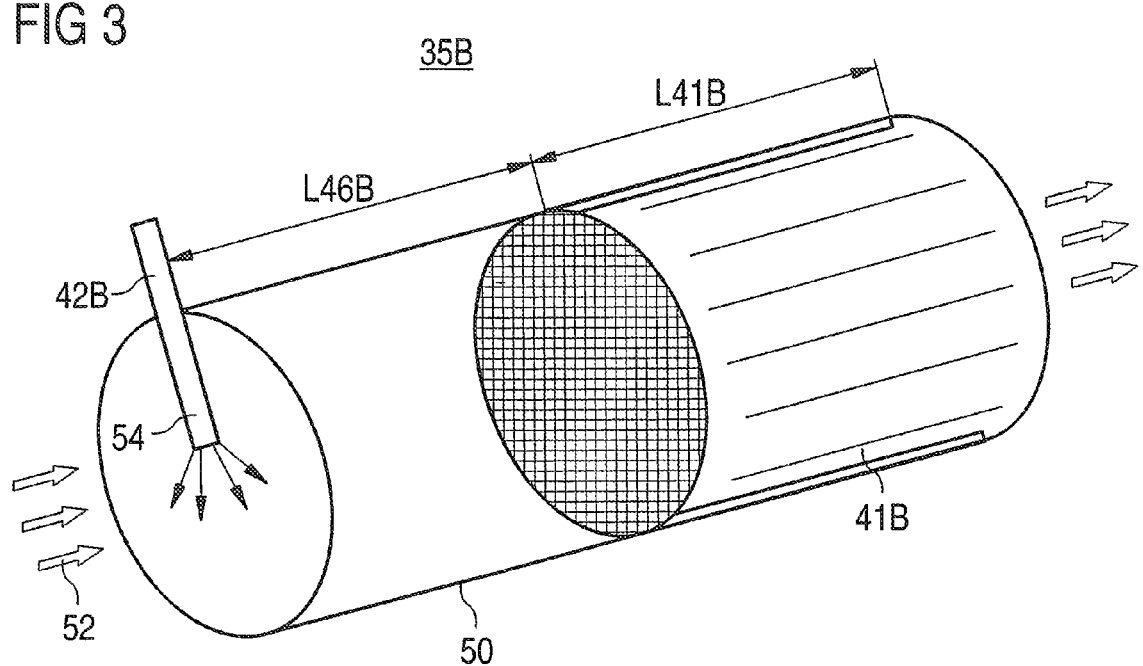
FIG. 3 is a schematic view of a turbine connection of a two-stage turbocharged system with an SCR system.

Referring to FIGS. 1 to 3, an internal combustion engine 1, e.g. an in-line 6-cylinder engine, may comprise an engine block 10, a two-stage turbocharged system 12, a fuel tank, one ore more catalysts, and an engine control unit. Engine block 10 may include a crankcase within which a crankshaft 14 may be supported. Crankshaft 14 is indicated by a dashed line in FIG. 1. Crankshaft 14 may be connected to pistons (not shown), which may be movable within respective cylinders 16A to 16F during operation of the engine.

Engine block 10 as illustrated may have end sides 18L and 18H, being opposite in a lengthwise direction defined by crankshaft 14. Engine block 10 may further have long sides 20A and 20B being opposite in a direction orthogonal to the lengthwise direction of crankshaft 14.

An intake manifold 22 may extend along the long side 20A of engine block 10 and may be fluidly connected to each of cylinders 16A to 16F. Each of cylinders 16A to 16F may be provided with at least one inlet valve (not shown), which may be adapted to open or close the fluid connection between intake manifold 22 and a working chamber of the respective cylinder.

At long side 20B, an exhaust manifold 24 may be provided, which may be connected to each of cylinders 16A to 16F. Each of cylinders 16A to 16F may be provided with at least one exhaust valve (not shown) configured to open and close the fluid connection between the working chamber of respective cylinders 16A to 16F and exhaust manifold 24.

Generally, when engine 1 is operated, charge air may be introduced into cylinders 16A to 16F through intake manifold 22. After combustion, exhaust gases generated by the combustion process may be released from cylinders 16A to 16F through exhaust manifold 24.

Two-stage turbocharged system 12 may comprise a low-pressure stage turbocharger 26 and a high-pressure stage turbocharger 28, the turbochargers 26 and 28 forming a sequential turbocharging system.

Generally, turbochargers may be applied to use the heat and pressure of the exhaust gas of an engine to drive a compressor for compressing the charge air for the engine. Specifically, exhaust gas passing a turbine of a turbocharger, may rotate the turbine, thereby decreasing in pressure and temperature. A compressor of the turbocharger is rotatably connected via a common shaft with the turbine and may be driven by the turbine.

At end side 18L (also referred to as low-pressure side), low-pressure stage turbocharger 26 may be fixedly attached to engine block 10, e.g. directly or as a unit in combination with other components such as coolant blocks etc. Low-pressure stage turbocharger 26 may comprise a compressor $C_L$ and a turbine $T_L$ that are mechanically connected via a common shaft $S_L$.

At side 18H (also referred to as high-pressure side), high-pressure stage turbocharger 28 may be fixedly attached to engine block 10, e.g. directly or as a unit in combination with other components such as coolant blocks etc. High-pressure stage turbocharger 28 may comprise a compressor $C_H$ and a turbine $T_H$ that are connected via a common shaft $S_H$.

An inlet of compressor $C_L$ may be configured to suck in charge air for the combustion process. Generally, an outlet of compressor $C_L$ may be fluidly connected via compressor connection 34 with an inlet of compressor $C_H$. For example, the outlet of compressor $C_L$ may be connected via a first cooler 30 to an inlet of compressor $C_H$. Then, an outlet of compressor $C_H$ may be connected via a second cooler 32 with intake manifold 22 being configured to distribute the charge air to cylinders 16A to 16F.

Low-pressure stage turbocharger 26 and first cooler 30 may form a first unit that as such may be mounted to end side 18L of engine block 10. High-pressure stage turbocharger 28 and second cooler 32 may form a second unit that as such may be mounted to end side 18H of engine block 10.

Usually, access to engine components, e.g. cylinders 16A to 16F and manifolds 22, 24, may be provided from long sides 20A, 20B while side faces of engine block 10 at end sides 18L and 18H may be configured and shaped for mounting large components of two-stage turbocharged system 12, e.g. turbochargers 26, 28 or cooler/turbocharger units. The disclosed configuration of mounting the units comprising the turbocharges at the opposing ends may result in a compact design still providing the required access to the engine from the long sides 20A, 20B and the turbochargers from the end sides 18L, 18H.

As described above, the charge air provided for the combustion process may be compressed prior to introduction into the engine cylinders using two-stage turbocharged system 12.

During operation of engine 1, the charge air may be accordingly twice compressed and cooled before charging of the cylinders 16A to 16F. Within cylinders 16A to 16F, further compression and, thereby, heating of the charge air may be caused through the movement of the pistons. Then, an appropriate amount of fuel, e.g. diesel oil, marine diesel oil, heavy fuel oil, alternative fuels, or a mixture thereof, may be injected into cylinders 16A to 16F. Therein, the fuel may be combusted with the compressed charged air and produce exhaust gases, which may be discharged via exhaust manifold 24.

For medium speed large internal combustion engines, compressor $C_L$ may compress the charge air to 4-5 bar at 180° C. Cooler 30 may cool the charge air from about 180° C. to 45° C. Compressor $C_H$ may compress the charge air to 7-8 bar at 180° C. and cooler 32 may cool the charge air from about 180° C. to 45° C. After combustion, the exhaust gas may have a pressure of about 5 to 6 bar at a temperature in the range of about 450° C. to 500° C. Within turbine connection 35, the pressure may droop to 3-4 bar and a temperature in the range of about 350° C. to 400° C. After turbine $T_L$ the temperature at ambient pressure may be in the range of or below 250° C.

An outlet of exhaust manifold 24 may be connected to an inlet of turbine $T_H$. An outlet of turbine $T_H$ may be fluidly connected with an inlet of turbine $T_L$ via a turbine connection 35 and an outlet of turbine $T_L$ may release the exhaust gas to, for example, a secondary exhaust filtering system or directly into the environment.

The above described cycle may be repeated continuously as the engine continues to run, thereby generating vibrations through the combustion itself and the movement of the pistons and crankshaft.

During operation of engine 1, compressors $C_L$ and $C_H$ may be driven by turbines $T_L$ and $T_H$ in a controlled manner as the amount of exhaust gas provided to turbine $T_H$ may be controlled, for example, via a valve V provided in a valve connection 36 fluidly connecting exhaust manifold 24 and turbine connection 35.

Turbine connection 35 extends along long side 20B. In the case of a medium speed large internal combustion engine turbine connection 35 may have a length of several meters, e.g. 5 m. Turbine connection 35 may be, e.g., a tubular conduit having an inner diameter of several tenths of meters. Generally, turbine connections may have an inner diameter of about 0.5 to 1 times the inner diameter of a piston of the turbocharged internal combustion engine. For internal combustion engines having piston diameters of e.g. 0.2 to 0.6 m, an inner diameter of turbine connections may be in the range of about 0.1 m to 0.6 m, e.g. about 0.3, 0.4 m, or 0.5 m or larger. For medium speed internal combustion engines, inner diameters of turbine connections may be in the range of about 0.3 m to 0.5 m.

Figure 4:
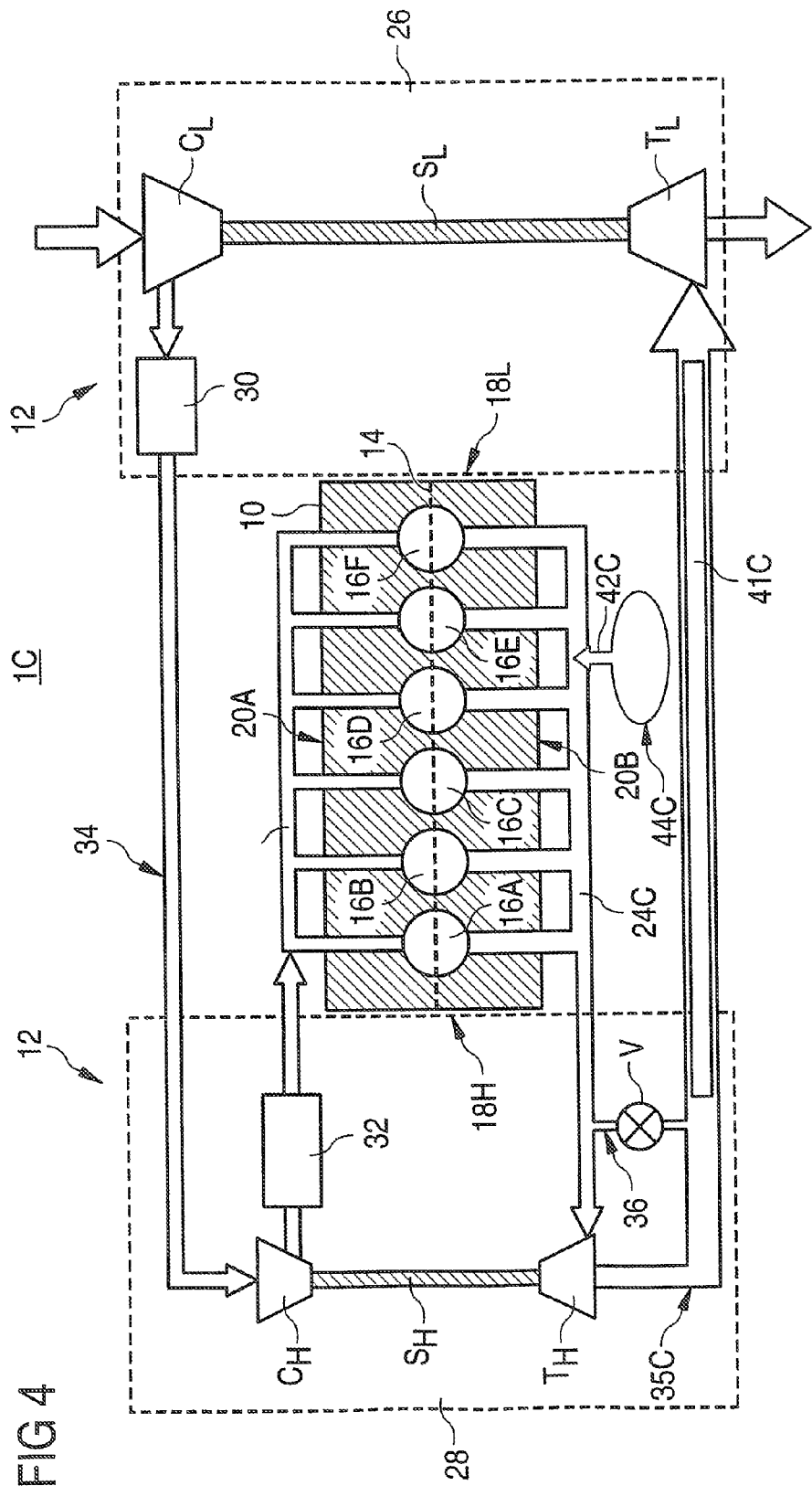
FIG. 4 is a schematic top view of an internal combustion engine with a two-stage turbocharged system with a second catalyst configuration.
Figure 5:
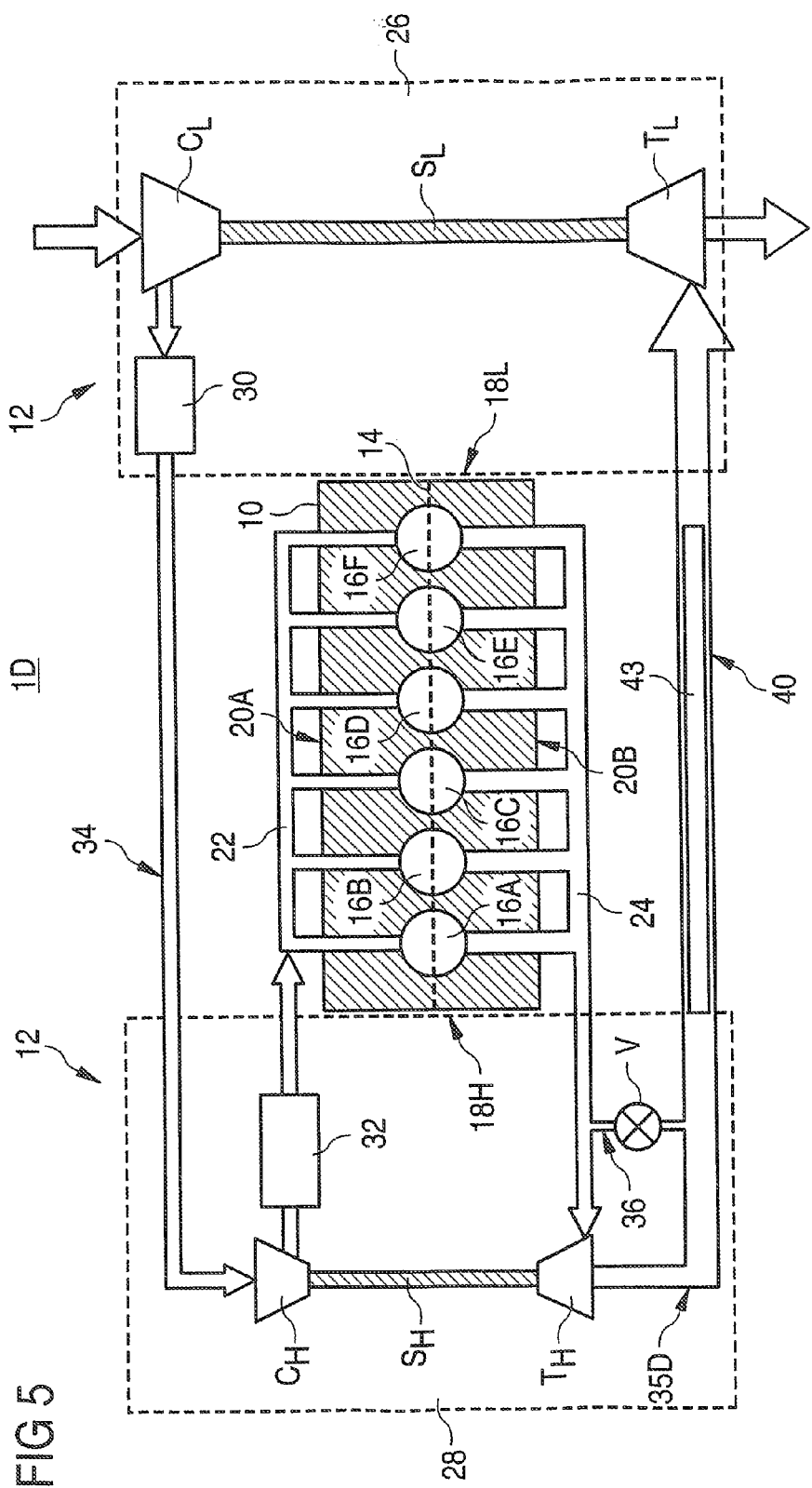
FIG. 5 is a schematic top view of an internal combustion engine with a two-stage turbocharged system with a third catalyst configuration.

Turbine connection 35 may include a catalyst section 40 comprising a catalyst 41, e.g. a selective catalytic reduction catalyst or an oxidation catalyst (see also the embodiment of FIG. 5). Upstream of catalyst section 40, an injection inlet 42 for injecting a chemical reagent (e.g. urea as a reductant for SCR) may be provided, e.g. for injecting the chemical reagent into turbine connection 35 (as shown in FIG. 1), in exhaust manifold 24C (as shown in FIG. 4), or into turbine $T_H$ (not shown in the drawings).

In general, injection inlet 42 may be part of an (e.g. urea) injection system 44. Between injection inlet 42 and catalyst section 40, turbine connection 35 may include a reagent homogenization section 46. Reagent homogenization section 46 may have a length sufficiently long to provide a homogeneous distribution of the reagent in the exhaust gas before reaching catalyst 41. The length of homogenization section can be, e.g., about four times the inner diameter of the homogenization section or more; e.g. five times the inner diameter of the homogenization section of 0.3 m, e.g., 1.2 m or more.

In some embodiments, the length of homogenization section can be, e.g., about two times the inner diameter of the homogenization section or more. In some configurations, additional homogenization may be achieved by structural design or additional components (e.g. turbine) such that a shorter length of homogenization section can be applied. For example, injecting the reagent into or upstream of turbine $T_H$ may allow the homogenization section having a reduced length as the turbine itself may mix the reagent with the exhaust in a sufficient manner. In some embodiments, the SCR catalyst may therefore be positioned directly downstream of, e.g. next to turbine $T_H$.

By providing the (e.g. SCR) catalyst between the stages of the two-stage turbocharged system, components of the exhaust gas, e.g. $NO_X$, may perform the catalytic reaction (e.g. SCR) at pressures in a range from 2-5 bar, e.g., for medium speed engines at a pressure of about 3-4 bar and in a temperature range from about 300° C. to 450° C., e.g. for medium speed engines at a temperature of about 350° C. to 400° C. As the required catalytic surface may be proportional to the volume of the catalyst, the dimensions of the catalyst may be smaller at increased pressure than for a catalyst provided at ambient pressure, e.g. after turbine $T_L$ (i.e. at about 1 bar and 250° C.).

Moreover, by mounting the turbochargers at opposite sides of the engine block, mounting may be simplified and space may be used effectively.

In FIG. 2, an engine 1A is illustrated that comprises a low-pressure turbocharger 26A and a high-pressure turbocharger 28A that each form structural units together with coolers 30A and 32A, respectively. The units may be fixedly connected to an engine block 10A at end sides 18L and 18H.

Along long side 20B, an exhaust manifold 24A may be fluidly connected to each of the cylinders (shown between turbochargers 26A and 28A) and an inlet manifold (not shown in FIG. 2) may similarly be fluidly connected to the cylinders.

A compressor connection section 34A may extend between end sides 18L and 18H of engine block 10A along long side 20B of engine block 10A. Specifically, compressor connection section 34A may extend from the outlet of the first cooler 30A to the inlet of the compressor of high-pressure turbocharger 28A. Compressor connection section 34A may be a tubular conduit used, for example, to add an additive (e.g. water) to the pre-compressed charge air.

A turbine connection 35A may extend between end sides 18L and 18H of engine block 10A along long side 20B of engine block 10A. Specifically, turbine connection 35A may extend from the outlet of turbine $T_H$ of high-pressure turbocharger 28A to the inlet of turbine $T_L$ of low-pressure turbocharger 26A. Turbine connection 35A may comprise a linear tubular segment that may be used as a catalyst section 40A with an e.g. SCR, catalyst 41A schematically indicated in FIG. 2.

The reagent injection (not explicitly shown in FIG. 2) may be positioned upstream (the arrows in FIG. 2 indicate the direction of the gas stream during operation) of catalyst section 40A of turbine connection 35A. For example, the injection may occur into the exhaust manifold at one or more positions or into turbine $T_H$.

In FIG. 2, catalyst 41A may be an SCR catalyst or an oxidation catalyst. In some embodiments an SCR catalyst and an oxidation catalyst may be provided.

In FIG. 2, an EGR system 45 is shown. EGR may be used to reduce the $NO_X$ generated during the combustion and may in some cases be used together or alternatively to SCR during operation. For example, during the start up of an engine, EGR may be used and, for a warmed up engine, SCR may be used. When an EGR system is included, the injection may occur into the exhaust manifold between an EGR outlet from the exhaust manifold (providing the exhaust to the charge air side) and an entrance of turbine $T_H$.

In some embodiments, EGR system 45 shown in FIG. 2 may not be provided.

In some embodiments, the intake manifold and exhaust manifold 24B may be integrally cast with, e.g., the crank case of engine block 10A.

In some embodiments, the above disclosed two-stage turbocharged system may be applied to a V-engine including, for example, two cylinder banks, each corresponding to the single cylinder banks of FIG. 1 or 2, one of which being mirrored with respect to a vertical central plane of the engine block including its crankshaft. In those embodiments, an intake manifold may be located, for example, between the cylinder banks and each of the cylinder banks may be provided with a separate exhaust manifold. Additional compressors, turbines, turbochargers may be provided, e.g. for further compressing recirculated exhaust gas within an EGR connection.

Referring to FIG. 3, details of an SCR system are shown for the configuration of complete integration of the SCR system into a turbine connection 35B. Similar considerations may apply to configurations in which the SCR injection is performed upstream of turbine $T_H$. At an injection inlet 42B, an injector 54 for urea may be mounted that may inject urea, e.g. a urea solution, into the exhaust gas that passes in the direction indicated by arrows 52. Within a homogenization region having a length L46B, the urea may be distributed in the exhaust gas before the urea-exhaust gas mixture enters into an SCR catalyst 41B. SCR catalyst 41B may have a length L41B and provide a large surface of a catalytic reagent applied to a carrier (e.g. a carrier channel structure) for the SCR reaction.

For example, SCR catalyst 41B may be completely positioned within a conduit 50 of turbine connection 35B, thereby efficiently using the space for SCR.

For example, in a tubular conduit, a cylinder-shaped SCR catalyst may have an outer diameter that corresponds essentially to the inner diameter of the tubular conduit. Specifically, the outer diameter of a turbine connection for a medium speed engine may be in the range of about 0.5 m to 0.6 m and the inner diameter about 0.5 m. Accordingly, the outer diameter of the SCR catalyst may be about 0.5 m.

In some embodiments, for example, two thirds of the length of the turbine connection may be filled-in with the SCR catalyst. Thus, for a turbine connection having a length of 6 m, urea may be injected at a distance of about 1 m from the high-pressure stage turbocharger and may afterward be homogeneously distributed within the exhaust gas within a homogenizing section of a length of about 1 m (L46B) such that the SCR process may then be performed with an SCR catalyst having a length of about 4 m (L41B). For embodiments in which urea is injected upstream of or into turbine $T_H$, the homogenization section may be reduced in length due to mixing of the urea within the turbine $T_H$.

Due to the significant length of the turbine connection in the case of, e.g., medium speed internal combustion engines, and its mounting to the engine via the separated stages of the two-stage turbocharged system, the components of the SCR system and, in particular, the SCR catalyst may be exposed to vibrations of the engine. Therefore, catalyst reagents may be, for example, applied to a metal base structure.

The disclosed configurations may provide the advantage that space may be effectively used for providing an SCR catalyst in between stages of a two-stage turbocharged system. Moreover, the disclosed configuration may have the advantage that the turbocharging stages may be fixedly connected to the engine block and, because each of the turbocharging stages is directly connected to the engine block, the vibration amplitudes of the components of the turbocharging stages may be reduced in comparison to a two-stage turbocharged system having both turbocharging stages positioned at the same side of the engine block.

In some embodiments, the complete length of the turbine connection may be used for the catalyst. In FIG. 4, an internal combustion engine 1C is shown that corresponds essentially to internal combustion engine 1 of FIG. 1 with the exception of the configuration of the SCR catalytic system. Accordingly, for the common aspects, it is referred to the description of FIG. 1.

In contrast to FIG. 1, a catalyst 41C may extend within, e.g. more than 80% of the length of turbine connection 35C. For SCR, an injection system 44C may then be configured such that via an injection inlet 42C a reagent may be injected into an exhaust manifold 24C, e.g. between the connecting pipes to cylinders 16D and 16E (shown in FIG. 4) or at any other position of exhaust manifold 24C. Accordingly, the injected reagent may be homogeneously distributed when passing along an exhaust manifold 24C and being mixed with the exhaust of the remaining cylinders. In addition, the reagent may be further homogeneously distributed within the exhaust gas when passing turbine $T_H$.

As mentioned above, in addition or alternatively, also an oxidation catalyst may be provided in turbine connection 35C.

In FIG. 5, an internal combustion engine 1D is shown that only provides an oxidation catalyst 43 within a turbine connection 35D and does not provide an SCR catalyst. The main configuration of internal combustion engine 1D corresponds essentially to internal combustion engine 1 of FIG. 1 with the exception that no SCR injection system is provided.

In some embodiments, the high-pressure stage turbocharger and the low-pressure stage turbocharger may be positioned on the opposing long sides of an engine block. In those embodiments, sufficient access to the various engine components may be provided by specific arrangement or demountabililty of the two-stage turbocharging system.

FIGS. 6 to 9 illustrate an exemplary embodiment of a urea injection system used in an internal combustion engine 1E. Internal combustion engine 1E may comprise an engine block 10E, a two-stage turbocharged system, a fuel tank, an SCR catalyst 41E, and an engine control unit. As engine 1A shown in FIG. 2, engine 1E may comprise a low-pressure turbocharger 26E and a high-pressure turbocharger 28E that each form structural units together with coolers 30E and 32E, respectively. The units may be fixedly connected to engine block 10E at end sides 18L and 18H. A compressor connection section 34E may extend between end sides 18L and 18H of engine block 10E along long side 20B of engine block 10E.

For the configuration and operation of internal combustion engine 1E, in particular the two-stage turbocharged system, it is referred to the foregoing discussion of engines 1 to 1D.

An intake manifold (not shown) may extend along the long side of engine block 10E and may be fluidly connected to each of the cylinders of engine block 10E that may be provided with at least one inlet valve (not shown). The inlet valves may be adapted to open or close the fluid connection between intake manifold and a working chamber of the respective cylinder.

At long side 20B, an exhaust manifold 24E may be provided, which may be connected to each of the cylinders of engine block 10E. Each of the cylinders may be provided with at least one exhaust valve (not shown) configured to open and close the fluid connection between the working chamber of respective cylinders and exhaust manifold 24E.

A turbine connection 35E may extend along long side 20B. As discussed above, in the case of a medium speed large internal combustion engine turbine connection 35E may have a length of several meters, e.g. 5 m. Turbine connection 35E may be, e.g., a tubular conduit having an inner diameter of several tenths of a meter, e.g., of about 0.5 to 1 times the inner diameter of a piston of the turbocharged internal combustion engine. For internal combustion engines having piston diameters of e.g. 0.2 to 0.6 m, an inner diameter of turbine connections may be in the range of about 0.1 m to 0.6 m, e.g. about 0.3, 0.4 m, or 0.5 m or larger. For medium speed internal combustion engines, inner diameters of turbine connections may be in the range of about 0.3 m to 0.5 m.

Figure 6:
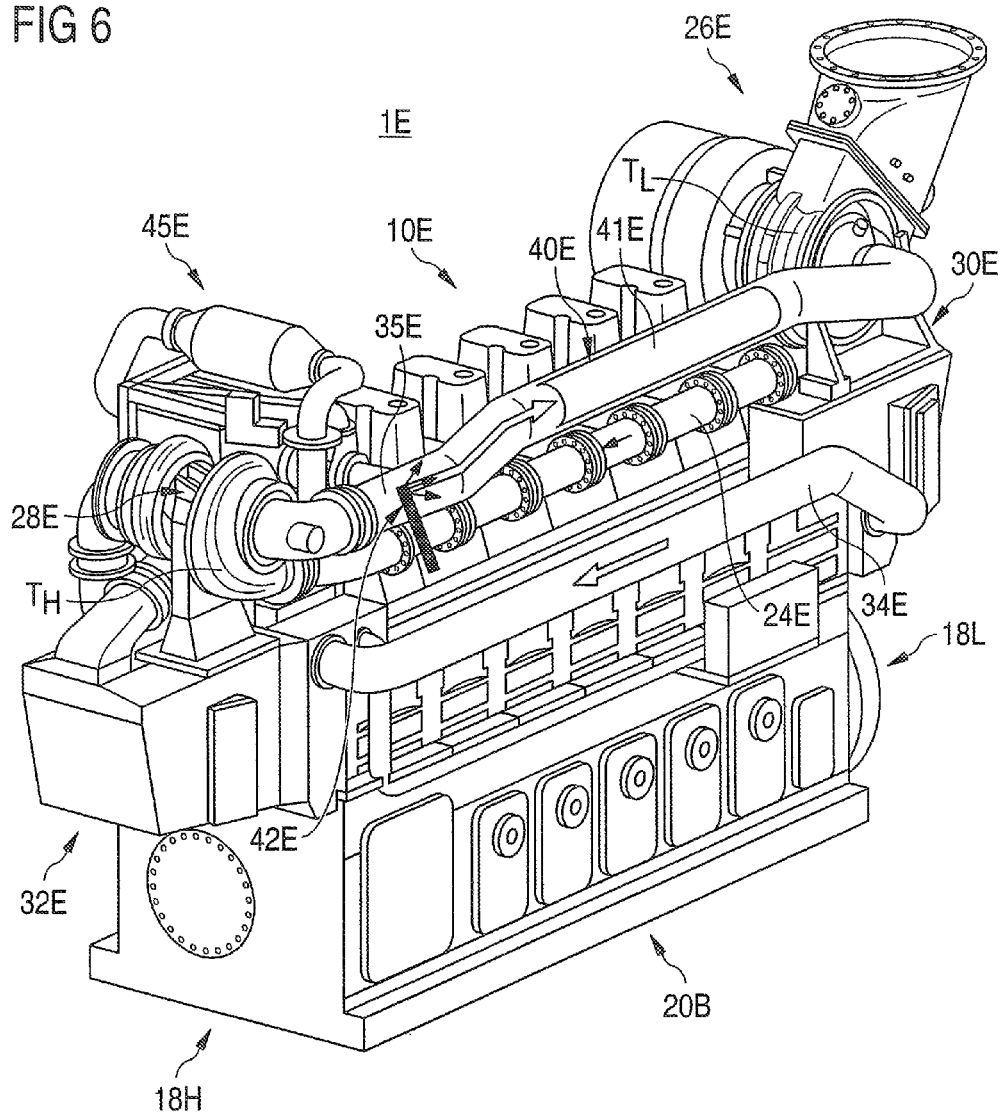
FIG. 6 is a schematic perspective view of an internal combustion engine with a two-stage turbocharged system and a urea injection system for an SCR catalyst.

Turbine connection 35E may include a catalyst section 40E comprising SCR catalyst 41E. Upstream of catalyst section 40E, an injection inlet 42E of the urea injection system may be provided. The urea injection system may be configured to inject urea into turbine connection 35E (as shown in FIG. 6) or into or upstream of turbine $T_H$, urea being an example of a chemical reagent used for SCR. Between injection inlet 42E and catalyst section 40E, turbine connection 35E may include a reagent homogenization section. As discussed above, a reagent homogenization section may have a length sufficiently long to provide a homogeneous distribution of the reagent in the exhaust gas before reaching catalyst 41E, e.g. 1.2 m or more. In some embodiments, the length of homogenization section may be, e.g., about twice the inner diameter of the homogenization section or more. In some configurations, additional homogenization may be achieved by structural design or additional components (e.g. turbine) such that a shorter length of homogenization section may be applied.

When providing the SCR catalyst between the stages of the two-stage turbocharged system, components of the exhaust gas, e.g. $NO_X$, may perform the catalytic reaction at pressures in a range from 2-5 bar, e.g., for medium speed engines at a pressure of about 3-4 bar and in a temperature range from about 300° C. to 450° C., e.g. for medium speed engines at a temperature of about 350° C. to 400° C.

The increased temperature is generated in the surroundings when operating engine 1E may affect the urea supplied by the urea injection system. For example, it may cause evaporation of the urea within the supply lines of the urea injection system that are used to supply the urea for injection.

Figure 7:
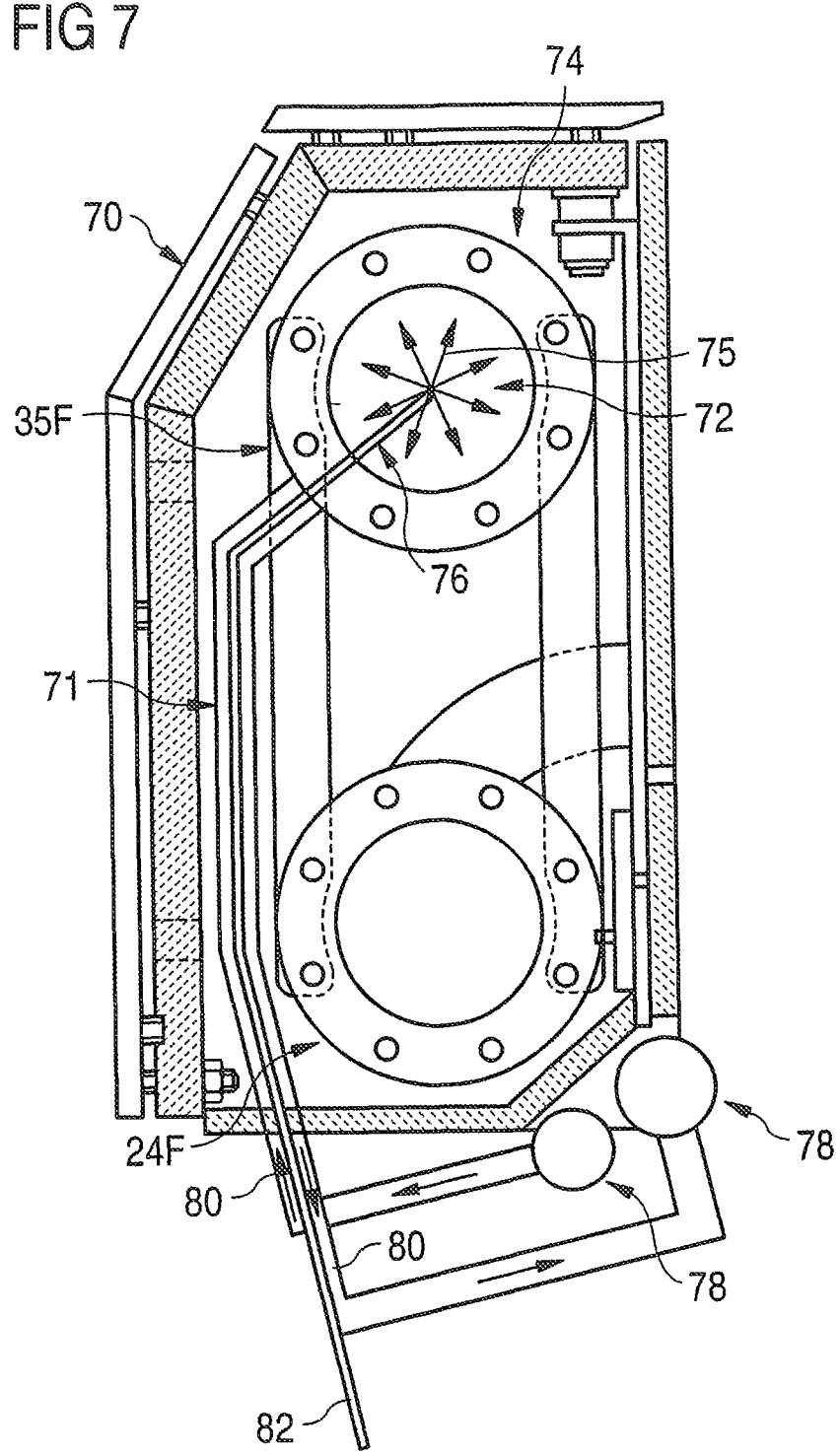
FIG. 7 is a cut view of a turbine connection with a cooled urea injection system.

The effect of the temperature may even be further increased if an insulated exhaust gas box 70 as shown in FIG. 7 is used.

Specifically, FIG. 7 shows a cut view through an embodiment of an exhaust manifold 24F and a turbine connection 35F at the position of a urea injection supply line 71. Exhaust manifold 24F and turbine connection 35F may be arranged within insulated exhaust gas box 70 and temperatures of e.g. 350° C. at an inside 72 of turbine connection 35F may result at a temperature of, e.g., about 500° C. at an inner region 74 of insulated exhaust gas box 70.

To reduce or avoid evaporation of urea before reaching an injection tip 76 of injection supply line 71, injection supply line 71 may be cooled using coolant of the engine, e.g., cooling water from coolant conduits 78 of the coolant circuit. In FIG. 7, the injection of urea into turbine connection 35F is indicated by arrows 75 and coolant conduits 78 are indicated schematically.

For the cooling, injection supply line 71 may comprise a urea conduit 82 surrounded by coolant channels 80 that are connected to coolant conduits 78. Thus, coolant may be deviated from the engine coolant circuit and used in the urea coolant system, i.e. run through coolant channels 80 and reduce or avoid the heating up of the urea supplied through the urea conduit 82.

While FIG. 7 illustrates injection into turbine connection 35F, a similar configuration may also be used for injection into turbine $T_H$ or exhaust manifold 24F.

FIG. 8 illustrates schematically the configuration of an injection supply line 171 of an example of a urea injection system arranged upstream of, e.g., an SCR catalyst 141. The direction of the gas stream is indicated by arrows 152. A urea conduit 182 may receive the urea from an urea reservoir. Urea conduit 182 may comprise an injection tip 176 that may reach into an exhaust conduit 135, e.g., a turbine connection. External to exhaust conduit 135, urea conduit 182 may be cooled via cooling channels 180A, 180B being connected to an external coolant circuit, e.g. of the engine.

During operation of the SCR catalyst system, urea is injected through an opening 184 of injection tip 176 into exhaust conduit 135. Opening 184 may, e.g., face downstream and provide a spread injection of the urea.

Figure 9A:
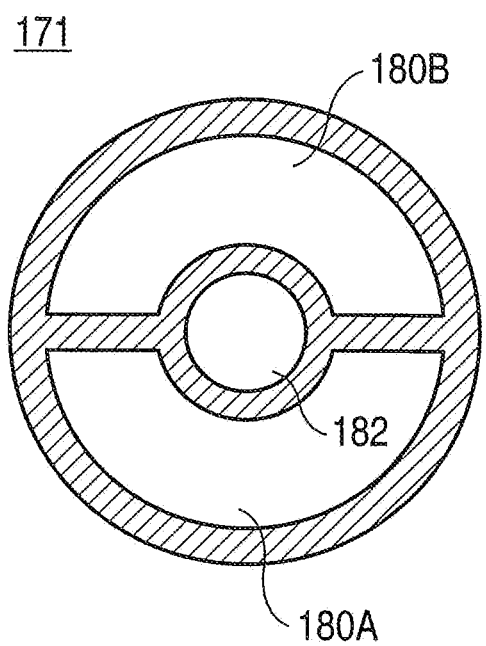
FIGS. 9A and 9B are cut views of the cooled urea injection system of FIG. 8.
Figure 9B:
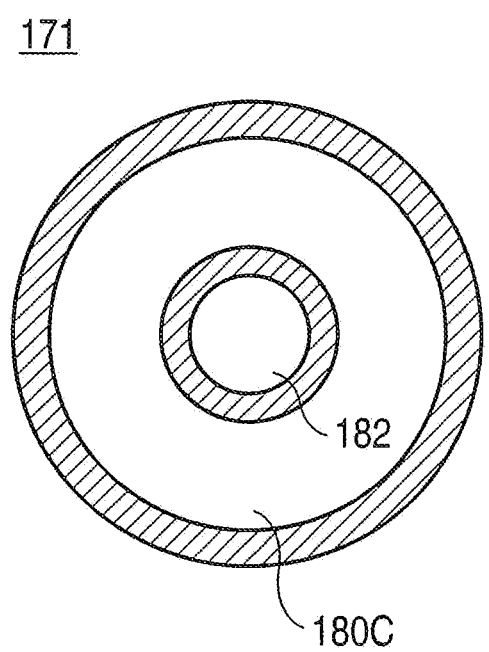

FIGS. 9A and 9B show cut views of injection supply line 171 at two positions indicated in FIG. 8 by arrows IXA and arrows IXB, respectively. As shown in FIG. 9A, cooling channel 180A may act as a supply line while cooling channel 180B may act as a discharge line of the coolant. Cooling channels 180A, 180B may surround urea conduit 182 at opposite sides. FIG. 9B illustrates the turning point, at which a connecting region 180C may connect cooling channels 180A, 180B. In the embodiment shown in FIGS. 8 and 9, the coolant system of the urea injection system may be provided primarily external to exhaust conduit 135. Alternatively or additionally, the cooling channels can be provided also within exhaust conduit 135 or they can be applied to one ore more sections of the urea conduit 182.

Besides two cooling channels 180A, 180B, additional channels can be provided.

Alternatively, only a circumferential section of urea conduit 182 may be subjected to the cooling channels.

In general, modifications of embodiments discussed with respect to FIGS. 1 to 5 may also be applicable to the embodiments discussed with respect to FIGS. 6 to 9. For example, although urea injection system 44E as shown in FIG. 6 is configured to inject urea into turbine connection 35E, the injection may alternatively (or additionally) take place at different locations, e.g. into exhaust manifold 24E or within turbine 28E. Similarly, the aspects and modifications discussed with respect to FIG. 3 may also be applicable to the embodiment shown in FIG. 8. With respect to exhaust gas recycling, an EGR system 45E shown in FIG. 6 may not be provided.

Similarly, modifications of embodiments discussed with respect to FIGS. 6 to 9 may also be applicable to the embodiments discussed with respect to FIGS. 1 to 5.

Using coolant of the engine to cool the urea before injection as illustrated above in connection with FIGS. 7 to 9 may present an exemplary embodiment of the general feature of an injection system comprising a cooling system for cooling an injected substance, in the above case urea for the SCR process. Alternatively, a cooling system may be used in internal combustion engines of different configuration (e.g. a single turbocharged system), which engines also generate heat in the vicinity of the injection system and its supply line(s) as also those engines may profit from cooling the substance to be injected before injection, e.g. when the substances are guided through the supply lines.

Further examples of an injected substance include water and ferrocene. Ferrocene can be used, for example, to reduce soot formation and can be injected into the exhaust gas as well as, e.g., into the compressor connection or the intake manifold described above providing gas to the cylinders of the engine. Also other substances may be injected upstream of the combustion process via a cooled injection system as described herein. For example, there may be a first injection system for ferrocene into an exhaust conduit, at least a part of the guided exhaust gas being added to the air used for the combustion process and a second injection system for injection urea into to the exhaust line before an SCR catalyst, where at least one of the injection systems includes a cooling system for cooling the guided content.

Accordingly, substances may be injected with or without the presence of a catalyst in the exhaust line. Thus, in a modified embodiment using an injection system with a cooling system as shown in FIGS. 1, 4, 6, and 8, the corresponding catalyst 41, 41A, and 141 may not be present.

A housing such as gas box 70 may increase the accumulated heat in the vicinity of the injection system and specifically its supply line(s) and thereby increase the need of such a cooling system.

The cooling system may also be based on a separate cooling system from the engine. For example, it may be a specific cooling system for the injection system.

In particular, in medium speed internal combustion diesel engines having a large size and, therefore, requiring a long path of the substance to be injected heat may be transferred to the substances to be injected. Accordingly, in particular of those large size internal combustion engines the concept of cooling a substance to be injected may advantageously be applied.

INDUSTRIAL APPLICABILITY

Herein, the term "internal combustion engine" may refer to internal combustion engines which may be used as main or auxiliary engines of stationary power providing systems such as power plants for production of heat and/or electricity as well as in ships/vessels such as cruise liners, cargo ships, container ships, and tankers. Fuels for internal combustion engines may include diesel oil, marine diesel oil, heavy fuel oil, alternative fuels or a mixture thereof, and natural gas.

In addition, the term "internal combustion engine" as used herein is not specifically restricted and comprises any engine, in which the combustion of a fuel occurs with an oxidizer to produce high temperature and pressure gases, which are directly applied to a movable component of the engine, such as pistons or turbine blades, and move it over a distance thereby generating mechanical energy. Thus, as used herein, the term "internal combustion engine" comprises piston engines and turbines.

Examples of internal combustion engines for the herein disclosed configuration of a two-stage turbocharged system include medium speed internal combustion diesel engines, like inline and V-type engines of the series M20, M25, M32, M43 manufactured by Caterpillar Motoren GmbH & Co. KG, Kiel, Germany, operated in a range of 500 to 1000 rpm.

Medium speed internal combustion engines may be large stand-alone engines that may provide reasonable access to the end sides of the engine block.

Although the preferred embodiments of this invention have been described herein, improvements and modifications may be incorporated without departing from the scope of the following claims.

The invention claimed is:

1. A turbocharged internal combustion engine, comprising:
an engine block with a first end side opposing a second end side having a plurality of cylinders connected to a crankshaft having an axis of rotation, the crankshaft; having a longitudinal axis along the axis of rotation extending between the first end side and the second end side;
a two-stage turbocharged system comprising a low-pressure stage turbocharger mounted along the first end side of the engine block and comprising a first turbine and a first compressor configured for pre-compressing charge air during operation of the turbocharged internal combustion engine, a high-pressure stage turbocharger mounted along the second end side of the engine block and comprising a second turbine and a second compressor configured for compressing the pre-compressed charge air during operation of the turbocharged internal combustion engine, a compressor connection fluidly connecting the first compressor and the second compressor; and
a turbine connection fluidly connecting the first turbine and the second turbine;
a selective catalytic reduction catalyst positioned within a catalyst section of the turbine connection;
an exhaust manifold fluidly connecting exhaust outlets of the plurality of cylinders with an inlet of the second turbine; and an outlet of the second turbine connecting to an inlet of the first turbine; and
an injection system with an injection inlet configured for injecting a chemical substance for the selective catalytic reduction through the injection inlet into the exhaust manifold and/or the second turbine.

2. The turbocharged internal combustion engine of claim 1, wherein the turbine connection and the compressor connection extend substantially from the first end side to the second end side of the engine block.

3. The turbocharged internal combustion engine of claim 2, wherein the catalyst section and the catalyst has a length of at least 2 m.

4. The turbocharged internal combustion engine of claim 3, further comprising an exhaust gas recirculation connection extending from an EGR exit of the exhaust manifold to a charge air side of the two-stage turbocharged system, wherein the injection inlet is positioned downstream of the EGR exit and upstream of the second turbine.

5. The turbocharged internal combustion engine of claim 4, wherein the injection inlet is arranged upstream of the catalyst section of the turbine connection.

6. The turbocharged internal combustion engine of claim 5 wherein the injection system comprises a conduit for supplying the chemical substance and a coolant system, the coolant system being configured to cool the chemical substance being supplied through the conduit.

7. The turbocharged internal combustion engine of claim 6, wherein the conduit comprises an injection tip that reaches into the exhaust manifold or the second turbine and an external section being external to the exhaust manifold or the second turbine, and the coolant system comprises coolant conduits being connected to a coolant circuit and extending along at least partly the external section of the conduit.

8. The turbocharged internal combustion engine of claim 7, wherein the injection inlet is separated by a homogenization section having a length of at least four times the inner diameter of the homogenization section, from the catalyst section.

9. The turbocharged internal combustion engine of claim 8, further comprising an oxidation catalyst positioned in the turbine connection.

10. The turbocharged internal combustion engine of claim 9, wherein the catalyst section of the turbine connection is configured as a first conduit and the selective catalyst reduction catalyst is positioned within the first conduit and completely fills in the conduit of the catalyst section and/or wherein the turbine connection is tubular shaped and has an inner diameter of 0.5 to 1 times the inner diameter of a piston of the turbocharged internal combustion engine.

11. The turbocharged internal combustion engine of claim 10, further comprising:
a valve connection connecting an exhaust manifold fluidly with the turbine connection upstream of the injection inlet, and a valve arranged within the valve connection configured to control the amount of exhaust gas driving the second turbine.

12. The turbocharged internal combustion engine of claim 11, wherein the catalyst comprises a catalyst layer applied to a metal structure.

13. The turbocharged internal combustion engine of claim 12, further comprising:
a first cooler arranged in the compressor connection between the first compressor and the second compressor and configured for cooling compressed charged air received from the first compressor; and/or
a second cooler arranged between the second compressor and the inlet openings of a plurality of cylinders and configured for cooling compressed charged air from the second compressor.

14. The turbocharged internal combustion engine of claim 13, wherein at least one of the low-pressure turbocharger, a unit comprising the low-pressure turbocharger and the first cooler, the high-pressure stage turbocharger, and a unit comprising the high-pressure stage turbocharger and the second cooler are fixedly connected to the engine block.

15. A turbocharged internal combustion engine, comprising:
an engine block with a first end side opposing a second end side having a plurality of cylinders connected to a crankshaft having an axis of rotation, the cranshaft having a longitudinal axis along the axis of rotation extending between the first end side and the second end side; and
a two-stage turbocharged system comprising a low-pressure stage turbocharger comprising a first turbine and a first compressor configured for pre-compressing charge air during operation of the turbocharged internal combustion engine, a high-pressure stage turbocharger comprising a second turbine and a second compressor configured for compressing the pre-compressed charge air during operation of the turbocharged internal combustion engine, a compressor connection fluidly connecting the first compressor and the second compressor;
a turbine connection fluidly connecting the first turbine and the second turbine; and
an SCR catalyst positioned within a catalyst section of the turbine connection;
wherein a low-pressure side unit comprising the low-pressure stage turbocharger is fixedly mounted along the first end side of the engine block and a high-pressure side unit comprising the high-pressure stage turbocharger is fixedly mounted along the second end side of the engine block.

16. A turbocharged internal combustion engine, comprising:
an engine block with a first end side opposing a second end side and a crankshaft having an axis of rotation, the crankshaft having a longitudinal axis along the axis of rotation extending between the first end side and the second end side; and
a two-stage turbocharged system comprising a low-pressure stage turbocharger mounted along the first end side of the engine block and comprising a first turbine and a first compressor configured for pre-compressing charge air during operation of the turbocharged internal combustion engine, a high-pressure stage turbocharger mounted along the second end side of the engine block and comprising a second turbine and a second compressor configured for compressing the pre-compressed charge air during operation of the turbocharged internal combustion engine, a compressor connection fluidly connecting the first compressor and the second compressor; and
a turbine connection fluidly connecting the first turbine and the second turbine.

17. The turbocharged internal combustion engine of claim 16, wherein the turbine connection and the compressor connection extend substantially from the first end side to the second end side of the engine block.

18. The turbocharged internal combustion engine of claim 17, further comprising a catalyst positioned within a catalyst section of the turbine connection wherein the catalyst section and the catalyst have a length of, at least 2 m.

19. The turbocharged internal combustion engine of claim 18, further comprising an urea injection system with an injection inlet configured for injecting a chemical substance for the SCR through the injection inlet into the turbine connection, wherein the injection inlet is arranged upstream of the catalyst section of the turbine connection, and a selective catalytic reduction catalyst positioned as the catalyst within the catalyst section of the turbine connection.

20. The turbocharged internal combustion engine of claim 19, further comprising a plurality of cylinders;
an exhaust manifold fluidly connecting exhaust outlets of the plurality of cylinders with an inlet of the second turbine;
the urea injection system with an injection inlet configured for injecting the chemical substance for the SCR through the injection inlet into the exhaust manifold, wherein the injection inlet is arranged upstream of the catalyst section of the turbine connection.

21. The turbocharged internal combustion engine of claim 20, wherein the injection system comprises a conduit for supplying the chemical substance and a coolant system, the coolant system being configured to cool the chemical substance being supplied through the conduit.

22. The turbocharged internal combustion engine of claim 21, wherein the conduit comprises an injection tip that reaches into the turbine connection or the exhaust manifold, and an external section being external to the turbine connection or the exhaust manifold, and the coolant system comprises coolant conduits being connected to a coolant circuit and extending along at least part of the external section of the conduit.

23. The turbocharged internal combustion engine of claim 22, wherein the injection inlet is separated by a homogenization section having a length of at least four times the inner diameter of the homogenization section, from the catalyst section.

24. The turbocharged internal combustion engine of claim 23, further comprising an oxidation catalyst positioned in the turbine connection.

25. The turbocharged internal combustion engine of claim 24, wherein the catalyst section of the turbine connection is configured as a first conduit and the selective catalyst reduction catalyst is positioned within the first conduit and completely fills in the conduit of the catalyst section and/or wherein the turbine connection is tubular shaped and has an inner diameter of 0.5 to 1 times the inner diameter of a piston of the turbocharged internal combustion engine.

26. The turbocharged internal combustion engine of claim 25, further comprising:
a valve connection connecting an exhaust manifold fluidly with the turbine connection upstream of the injection inlet, and a valve arranged within the valve connection configured to control the amount of exhaust gas driving the second turbine.

27. The turbocharged internal combustion engine of claim 26, wherein the catalyst comprises a catalyst layer applied to a metal structure.

28. The turbocharged internal combustion engine of claim 27, wherein the engine block comprises a plurality of cylinders, a charge air manifold fluidly connecting an outlet of the second compressor with inlet openings of the plurality of cylinders, and the exhaust manifold fluidly connecting exhaust outlets of the plurality of cylinders with an inlet of the second turbine.

29. The turbocharged internal combustion engine of claim 28, further comprising:
a first cooler arranged in the compressor connection between the first compressor and the second compressor and configured for cooling compressed charged air received from the first compressor; and/or
a second cooler arranged between the second compressor and the inlet openings of a plurality of cylinders and configured for cooling compressed charged air from the second compressor.

30. The turbocharged internal combustion engine of claim 29, wherein at least one of the low-pressure turbocharger, a unit comprising the low-pressure turbocharger and the first cooler, the high-pressure stage turbocharger, and a unit comprising the high-pressure stage turbocharger and the second cooler are fixedly connected to the engine block.

* * * * *

UNITED STATES PATENT AND TRADEMARK OFFICE
CERTIFICATE OF CORRECTION

| | |
|---|---|
| PATENT NO. | : 8,978,359 B2 |
| APPLICATION NO. | : 13/814340 |
| DATED | : March 17, 2015 |
| INVENTOR(S) | : Udo Schlemmer-Kelling |

It is certified that error appears in the above-identified patent and that said Letters Patent is hereby corrected as shown below:

On The Title Page,

Column 2, Item 57 (Abstract), line 1, delete "engine disclosed" and insert -- engine is disclosed --.

In The Specification,

Column 4, line 67, delete "ore" and insert -- or --.

Column 6, line 35, delete "droop" and insert -- drop --.

Column 11, line 31, delete "an urea" and insert -- a urea --.

Column 11, line 53, delete "ore" and insert -- or --.

Column 12, lines 29-30, delete "into to the" and insert -- into the --.

In The Claims,

Column 13, line 22, In claim 1, delete "crankshaft;" and insert -- crankshaft --.

Column 13, line 44, In claim 1, delete "turbine; and" and insert -- turbine and --.

Column 13, line 47, In claim 1, delete "for the selective" and insert -- for selective --.

Column 13, line 55, In claim 3, delete "the catalyst" and insert -- the selective catalytic reduction catalyst --.

Column 14, line 10 (Approx.), In claim 7, delete "partly" and insert -- part of --.

Signed and Sealed this
Eighth Day of March, 2016

Michelle K. Lee
*Director of the United States Patent and Trademark Office*

CERTIFICATE OF CORRECTION (continued)
U.S. Pat. No. 8,978,359 B2

Column 14, line 21, In claim 10, delete "catalyst" and insert -- catalytic --.

Column 14, line 23, In claim 10, delete "the conduit" and insert -- the first conduit --.

Column 14, line 29, In claim 11, delete "an exhaust" and insert -- the exhaust --.

Column 14, line 35, In claim 12, delete "the catalyst" and insert -- the selective catalytic reduction catalyst --.

Column 14, line 44, In claim 13, delete "a plurality" and insert -- the plurality --.